United States Patent [19]

Ezaki et al.

[11] Patent Number: 4,907,956

[45] Date of Patent: Mar. 13, 1990

[54] APPARATUS FOR MANUFACTURING OPTICAL INFORMATION RECORDING MEDIUM

[75] Inventors: Kozo Ezaki, Sakura; Sadaaki Shigeta, Narashino; Kazunari Sakai, Chiba; Noboru Murakami, Atsugi; Yasuyuki Tsuchiya, Shakujii; Yuichi Fujita, Odawara, all of Japan

[73] Assignees: Dainippon Ink and Chemicals, Inc., Tokyo; Global Machinery Co., Ltd., Kanagawa, both of Japan

[21] Appl. No.: 343,377

[22] Filed: Apr. 26, 1989

[30] Foreign Application Priority Data

Apr. 27, 1988 [JP] Japan ............................. 63-102669
Apr. 27, 1988 [JP] Japan ............................. 63-102670

[51] Int. Cl.$^4$ ....................... B29C 43/08; B29C 43/58
[52] U.S. Cl. ..................................... 425/110; 264/22; 425/90; 425/150; 425/174.4; 425/405.1; 425/810
[58] Field of Search ............... 425/110, 117, 125, 127, 425/150, 324.1, 425, 90, 174.4, 96, 810, 101, 405.1

[56] References Cited

U.S. PATENT DOCUMENTS

| | | | |
|---|---|---|---|
| 4,449,916 | 5/1984 | Ito et al. | 425/810 |
| 4,670,077 | 6/1987 | Peeters | 264/106 |
| 4,814,119 | 3/1989 | Scholtz | 425/174.4 |

*Primary Examiner*—Willard Hoag
*Attorney, Agent, or Firm*—Nixon & Vanderhye

[57] ABSTRACT

A disk substrate is supported by a support base formed on a center pin which is vertically movable on a selective basis, a table is set below the disk substrate, and a stamper is positioned on the table by means of a guide ring or the like. A ring-shaped portion of resin which is cured upon radiation of ultraviolet rays is set on the stamper. The center pin is then caused to descend by means of a drive mechanism, to a first position, at which position the disk substrate is on the point of contact with the resin. Then, the disk substrate is caused to descend intermittently in units of very small amounts, to a second position, at which position the entire periphery of the ring-like resin is brought into contact with the disk substrate. From the second position, the disk substrate is made to descend by means of the a load of a weight while, at the same time, the ring-shaped portion of resin is drawn by vacuum suction from its central position, thereby forming on the surface of the stamper a resin layer on which a record, formed on the stamper, is imprinted.

11 Claims, 5 Drawing Sheets

APPARATUS FOR MANUFACTURING OPTICAL INFORMATION RECORDING MEDIUM

BACKGROUND OF THE INVENTION

1. Field of the Invention

The present invention relates to an apparatus for manufacturing an optical information recording medium such as a disk for use in recording of digital data, and from which recorded information is read by using a laser beam. Such a recording medium is used in, for example, audio and video systems and in data recording of an information equipment.

2. Description of the Related Art

A method disclosed in Japanese Patent Disclosure (Kokai) No. 62-187004 is known as a means for manufacturing an optical disk. In this manufacturing method, a resin which cures upon radiation of ultraviolet rays thereon is sandwiched between a stamper having on its surface undulations for expressing data, and serving as a master and a disk substrate composed of a synthetic resin. Radiation of ultraviolet rays onto the layer of ultraviolet-curing resin, now having the undulated surface of the stamper imprinted thereon, causes the resin layer to be formed integral with the surface of the disk substrate. Thereafter, the resin layer and the stamper are separated, leaving a disk having an optical information recording surface formed thereon.

In order to manufacture an optical disk as described above, the ultraviolet-curing resin layer located between the disk substrate and the stamper must be formed having a uniform thickness. Exemplary methods of forming this resin layer are those disclosed in Japanese Patent Disclosure (Kokai) Nos. 53-116105 and 58-173623. However, using even these methods, bubbles are sometimes formed in the resin layer. Consequently, it is difficult, using conventional methods, to manufacture, on a consistent basis, optical disks with high precision through preventing formation of bubbles.

In addition, the resin layer on which the data recorded on the surface of the stamper is imprinted, upon radiation thereon of ultraviolet rays, must subsequently be separated from the stamper. Japanese Patent Disclosure (Kokai) No. 62-187004, for example, teaches a method wherein a push-up member located at a central portion of the disk substrate is pushed upward by a pin operated by air pressure, thereby to separate the resin layer from the stamper surface.

However, when such a mechanical force is used to separate the resin layer from the stamper, it creates a strong flexing force which acts not only on the disk substrate but also on the resin layer on which the recorded data has been imprinted, thereby damaging that surface of the resin layer. Further, the flexing force may cause distortion of, the disk substrate which supports the resin layer, and, when the disk substrate is pushed upward, the stamper may become separated from its support table and be pushed upward together with the disk substrate, i.e. resulting in non-separation of these two elements.

In consideration of the above problems, a method of fixing the stamper to the table has been proposed in Japanese Patent Disclosure (Kokai) No. 60-47253. According to this method, a first electromagnet is located at a position corresponding to a central portion of the stamper, and a second ring-like electromagnet is set to correspond to the periphery of the stamper, thereby attracting and holding the stamper consisting of a magnetic material. To separate the resin layer from the stamper, the first electromagnet is switched off, with the periphery of the stamper remaining attracted to the second electromagnet. In this state, by moving the stamper away from the resin layer, the resin is separated sequentially from the periphery of the stamper. However, this separating method requires a complicated arrangement of first and second electromagnets set in correspondence with the shape of the stamper. In addition, a complicated on/off control must be performed in respect of the two electromagnets, and an undesirably strong force acts on the resin layer during its separation from the stamper.

SUMMARY OF THE INVENTION

It is an object of the present invention to provide an apparatus for manufacturing an optical information recording medium such as an optical disk, in which a manufacturing process efficiently and automatically advances to manufacture an optical information recording medium with stable quality.

It is another object of the present invention to provide an optical recording medium manufacturing apparatus in which no bubbles remain in a resin layer portion on which data is transferred and recorded from a stamper in the above manufacturing process, thereby successively manufacturing a highly reliable information recording medium having good optical characteristics.

It is still another object of the present invention to provide an optical disk manufacturing apparatus in which a resin layer formed between a disk substrate and a stamper and having recorded data of the stamper transferred thereon can be easily and reliably peeled from the surface of the stamper without applying a peeling force on the resin layer, and this peeling step can be automatically performed, thereby manufacturing an optical disk with high reliability.

In an optical information recording medium manufacturing apparatus according to the present invention, a disk substrate is supported by a center pin, and this center pin is vertically driven. In addition, a table is set to be selectively rotated about the center pin, and a stamper is placed on this table. A resin having a property of curing by ultraviolet rays is formed into a ring-like shape on the stamper. The disk substrate is moved downward toward the surface of the stamper on which the resin ring is formed. When the surface of the disk substrate is brought into contact with part of the resin on the stamper, the disk substrate is intermittently moved downward in units of very small distances thereafter. When the entire periphery of the ring like-resin is brought into contact with the surface of the disk substrate in this manner, only the center pin is moved downward so that the resin interposed between the disk substrate and the stamper is spread on the stamper surface by the load of a weight set on the substrate.

In this case, the stamper is set on a table consisting of a magnet and kept at a predetermined position by a guide ring formed on the table. An air injection port is formed in a central portion of the table to inject air between the stamper and the resin layer.

In the manufacturing apparatus having the above arrangement, part of the ring-like resin formed on the surface of the stamper is brought into contact with the disk substrate, and then the substrate is intermittently moved downward to gradually increase a contact area between the resin and the disk. Finally, the entire periphery of the ring-like resin is brought into contact with the disk substrate. Thereafter, the resin on the stamper is compressed and spread to form a layer by the weight of the disk substrate portion. Therefore, it was confirmed by repetitive experiments that the resin layer having a uniform thickness could be formed with high stability between the stamper and the disk substrate, and bubbles in the resin layer were effectively exhausted.

In addition, the stamper is held on the table by a magnetic attracting force and kept at a predetermined position by the guide ring. After the cured resin layer is formed between the disk substrate and the stamper, the disk substrate is moved upward by a very small distance to separate the central portion of the disk substrate from the stamper surface by a very small distance, thereby forming a gap therebetween. Air is then supplied into the gap to peel the resin layer from the central portion of the stamper. That is, the resin layer can be peeled from the stamper while it is kept in contact with the disk substrate without applying a peeling force on the resin layer. As a result, a highly reliable optical disk can be manufactured.

DETAILED DESCRIPTION OF THE PREFERRED EMBODIMENT

Figure 1:
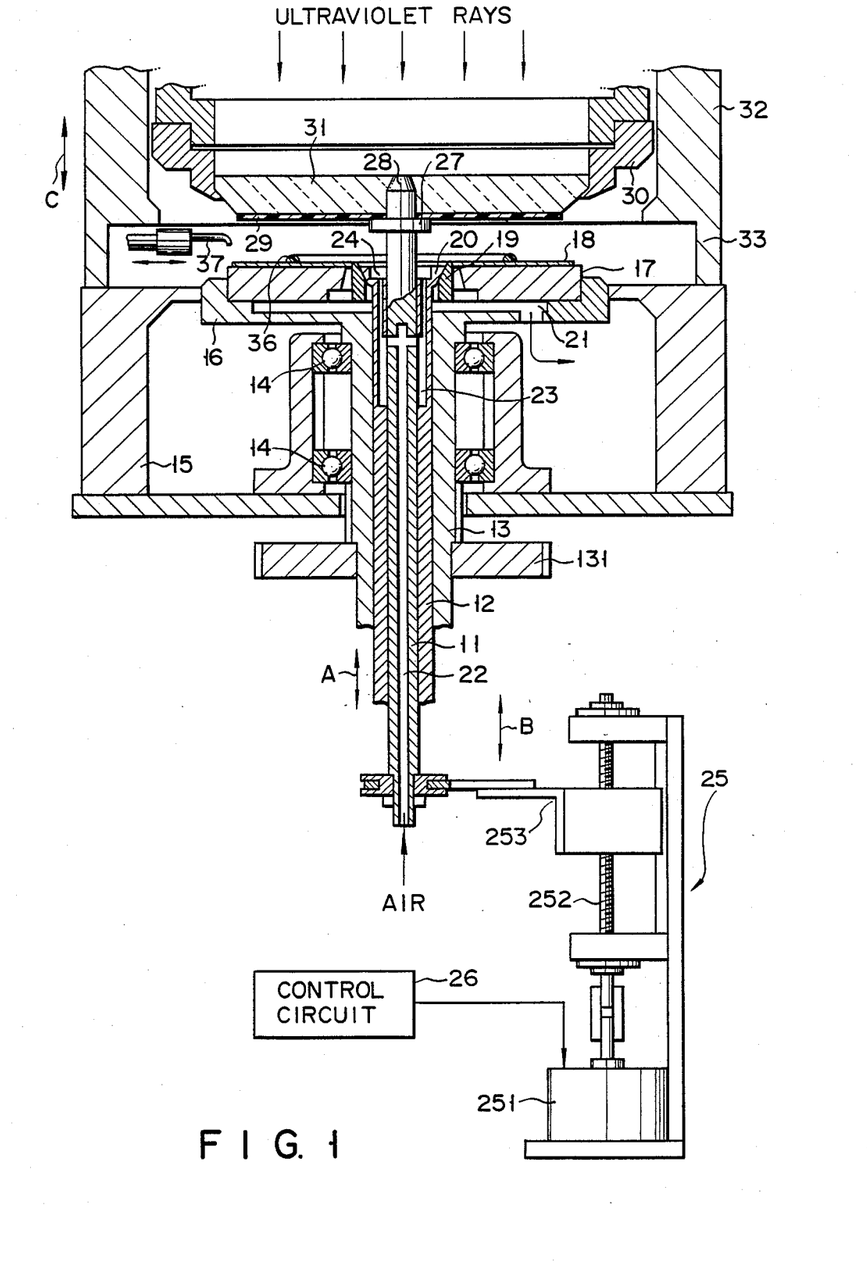
FIG. 1 is a sectional view for explaining an arrangement of an optical information recording medium manufacturing apparatus according to an embodiment of the present invention.

Referring to FIG. 1, an optical disk manufacturing apparatus comprises a center pin 11 serving as the center of a manufacturing operation and a valve member 12 constituted by a cylindrical body. The valve member 12 is vertically set, and the center pin 11 is inserted in a hollow portion of the valve member 12 so as to be freely moved in the axial direction in the hollow portion of the valve member 12. The valve member 12 is movably set in a hollow portion of a support member 13 constituted by a cylindrical body.

That is, the valve member 12 is vertically supported to be vertically movable by the support member 13, and the center pin 11 is vertically supported to be vertically movable by the valve member 12. The support member 13 is vertically supported by a bearing mechanism 14 with respect to a base 15 so as to be rotatable in a horizontal plane. The base 15 coaxially supports the support member 13, the valve member 12 and the center pin 11.

A gear 131 is integrally mounted on the support member 13 so that the member 13 is rotated upon rotation of the gear 131. A horizontal receiving base 16 is formed at the upper portion of the support member 13. A disk-like table 17 is set on the receiving base 16, and a stamper 18 is placed on the table 17. The table 17 consists of a magnet and attracts and holds the stamper 18 consisting of a magnetic metal by a magnetic force. That is, since the table 17 need only hold the stamper 18 by a magnetic force, the entire table 17 need not consist of a magnet as long as the magnetic force acts on the surface of the table 17. Although not shown in detail, the table 17 may have a permanent magnet embedded therein.

A circular guide hole is formed in a central portion of the stamper 18, and grooves or undulations for recording information bits are formed on its upper surface. A guide ring 19 formed integrally with the table 17 is fitted in the hole at the center of the stamper 18, thereby positioning the stamper 18 on the table 17.

An inner circumferential portion of the upper end portion of the guide ring 19 is tapered to form a valve seat, and a valve body 20 integrally formed at the upper end of the valve member 12 is brought into contact with this valve seat portion. That is, the valve member 12 is vertically moved as indicated by an arrow A, and the valve body 20 of the member 12 is brought into contact with or separated from the valve seat of the guide ring 19 accordingly.

For example, when the valve member 12 is located at a lower position as shown in FIG. 1, the valve body 20 is in contact with the valve seat of the guide ring 19. When the valve member 12 is moved upward from this position, a path is defined between the valve body 20 and the guide ring 19.

This path defined between the valve seat and the valve body 20 communicates with a path 21 formed in the receiving base 16, and the path 21 communicates with a vacuum source (not shown). Alternatively, the path 21 is caused to selectively communicate with the outer atmosphere via a switching valve.

An air path 22 is formed in the center pin 11 to correspond to its central axis portion and communicates with a path 23 formed in the valve member 12. The path 23 is open at the upper end face of the valve member 12 so that air supplied to the path 22 in the center pin 11 is injected from a disk-like receiving tray 24 formed to be recessed at a central portion of the table 17.

The center pin 11 is vertically moved as indicated by an arrow B by a drive mechanism 25. The drive mechanism 25 comprises a screw shaft 252 rotated by a servo motor 251, and the center pin 11 is supported by a moving body 253 threadably engaged with the screw shaft 252. By controlling a rotational angle of the servo motor 251, the center pin 11 is vertically, precisely moved in units of $\mu$m. The rotational angle of the servo motor 251 is controlled by a control circuit 26 comprising a microcomputer and the like.

A flange-like support base 27 is formed at an upper portion of the center pin 11 so that the center pin 11 projects upward from the support base 27. A disk substrate 29 is placed on the support base 27 so that its central position is set by the center pin 11.

The disk substrate 29 consists of a thermosetting resin such as an epoxy, an epoxy vinyl ester or a nonsaturated polyester, a thermoplastic resin such as a polymethyl methacrylate or a polycarbonate, or a light-transmitting material such as glass.

When the center pin 11 is moved downward, the support base 27 is fitted in the recess portion of the receiving tray 24.

A disk-like weight 31 consisting of a transparent body such as glass is placed on the disk substrate 29 supported by the center pin 11. The weight 31 is supported by a moving base 30 which is set inside a chamber 32 so as to be vertically movable. The chamber 32 is vertically movable as indicated by an arrow C. Referring to FIG. 1, the chamber 32 is set at a lower position. In this state, the lower end of the chamber 32 is in contact with the surface of the base 15 to define a chamber room 33 sealed on the upper surface of the base 15, and the table 17 is set in the chamber room 33.

An ultraviolet source (not shown) is located above the weight 31 in the chamber room 33 and radiates ultraviolet rays onto the surface of the stamper 18 placed on the table 17 through the transparent weight 31 and the disk substrate 29.

A resin 36 as a material for forming a recording layer of an optical disk is set on the stamper 18 subjected to radiation of ultraviolet rays. The resin 36 consists of a 2P (Photo Polimar) resin material which is cured upon radiation of ultraviolet rays. More specifically, the resin 36 is a liquid resin having an acryl group and/or an methacryl group at its terminal end, e.g., an acrylic and/or methacrylic ester of an epoxy resin, a urethane resin having an acryl group and/or a methacryl group at its terminal end, or a resin prepared by diluting the liquid resin by a reactive monomer having an acryl group and/or a methacryl group.

A predetermined amount of the resin 36 is injected from a nozzle mechanism 37 moved on the stamper 18 as indicated by an arrow while the table 17 is rotated, thereby forming a ring-like resin. The table 17 is rotated together with the support member 13 by rotating the gear 131.

Figure 2:
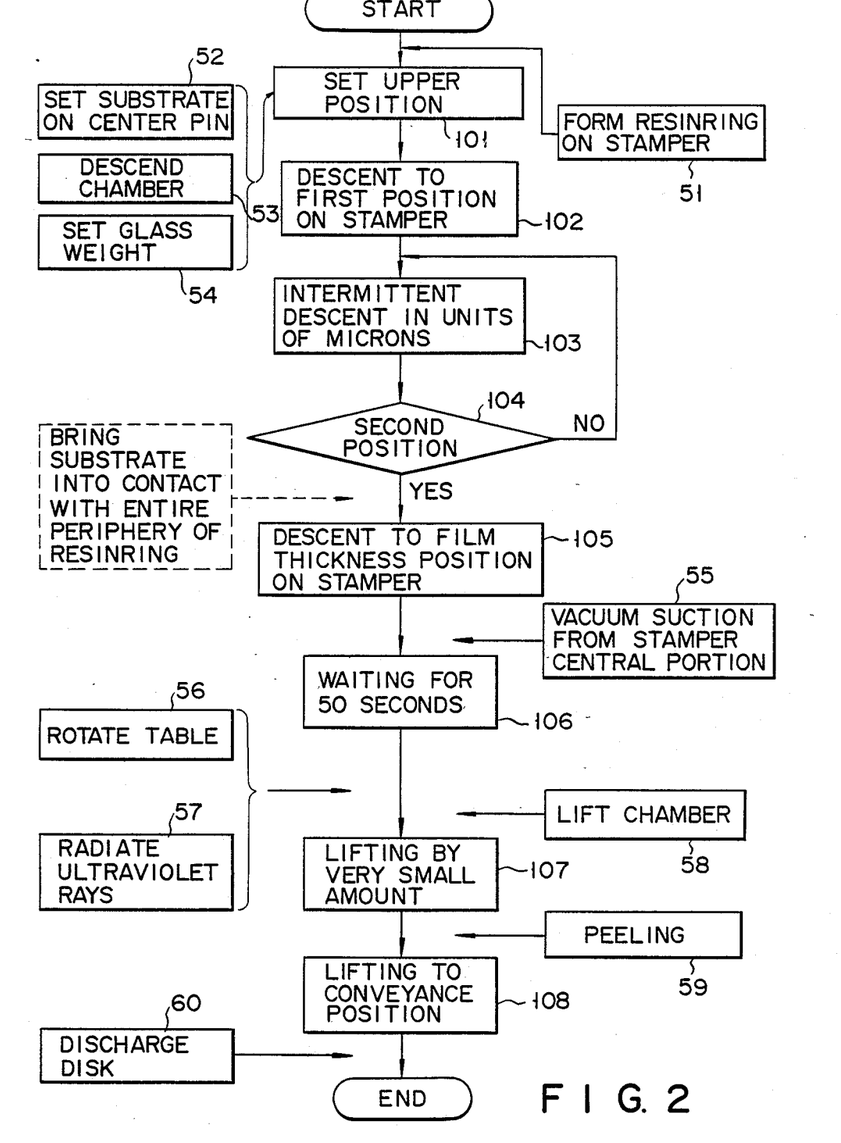
FIG. 2 is a flow chart for explaining a processing flow in a control unit for controlling especially a center pin of the manufacturing apparatus shown in FIG. 1.

FIG. 2 shows a processing flow of the control circuit 26 for controlling the movement of the center pin 11 and other manufacturing operations in a step of forming a recording layer of an optical disk.

Figure 3:
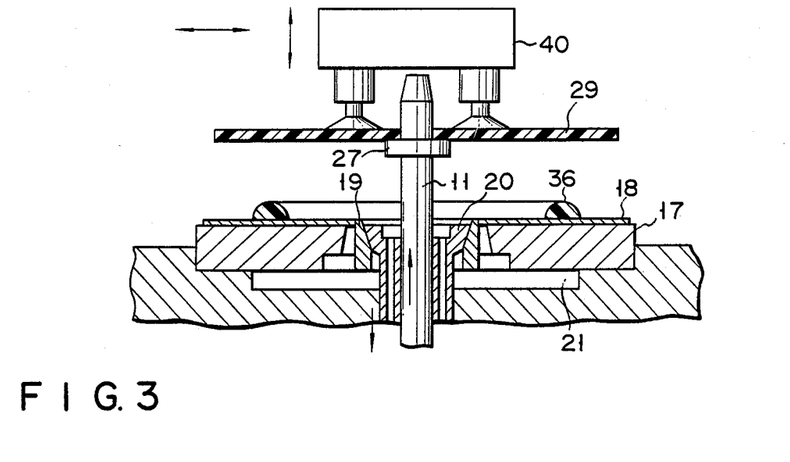
FIGS. 3 to 10 are sectional views for explaining a manufacturing process of especially a recording resin layer of an optical disk.

In step 101, the center pin 11 is initially set at an upper position as shown in FIG. 3. In this process, the nozzle mechanism 37 and the like are controlled to set the ring-like resin 36 about the center pin 11 in resin setting step 51. While the center pin 11 is kept at the upper position, a conveyor mechanism 40 conveys the disk substrate 29 to a position above the center pin 11 and sets the substrate 29 on the support base 27 fitted on the center pin 11 in substrate setting step 52. Before this process, the chamber 32 is moved upward from the position shown in FIG. 1 so as not to interfere with the movement of the conveyor mechanism 40. When the disk substrate 29 is set on the center pin 11 as described above, the chamber 32 is moved downward to the position shown in FIG. 1 in chamber descending step 53.

Figure 4:
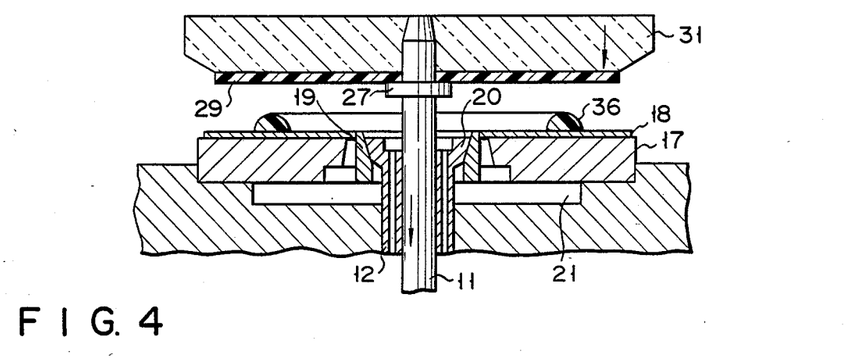

After the substrate 29 is set on the pin 11 in this manner, the weight 31 is placed on the substrate 29 as shown in FIG. 4 in weight setting step 54. In this case, the valve member 12 is set at a lower position as shown in FIG. 4.

Figure 5:
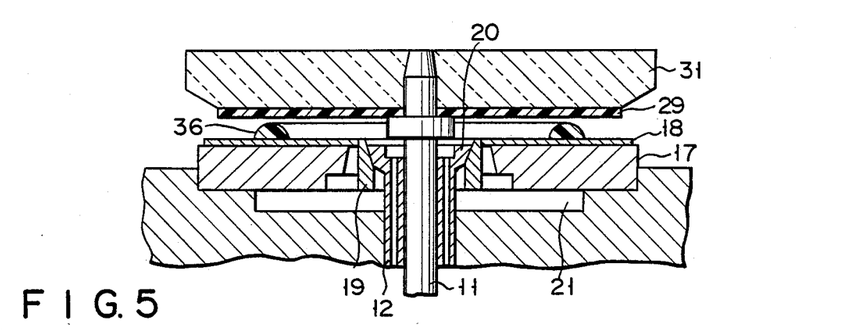

After the disk substrate 29 is set at a predetermined position and the weight 31 is placed on the substrate 29 as described above, in step 102, the center pin 11 is moved downward until an interval between the stamper 18 and the substrate 29 is set in a first state. The first state shown in FIG. 5 is set immediately before the lower surface of the disk substrate 29 is brought into contact with the ring-like resin 36.

After the center pin 11 is moved downward to set the interval between the substrate 29 and the stamper 18 in the first state, in step 103, the center pin 11 is intermittently moved downward every one to several seconds in units of microns. During an intermittent downward movement of the pin 11, part of the resin 36 is brought into contact with the lower surface of the disk substrate 29, and this contact portion area is gradually enlarged. Finally, the entire periphery of the ring-like resin 36 is brought into contact with the substrate 29.

In step 104, the control circuit 26 checks whether the interval between the stamper 18 and the disk substrate 29 is set in a second state. If the circuit 26 determines that the interval is set in the second state, the downward movement of the center pin 11 is stopped, and the flow advances to step 105. In the second state, the interval is set such that the entire periphery of the ring-like resin 36 is brought into contact with the disk substrate 29. The value of this interval is experimentally obtained and arbitrarily stored.

In step 105, the center pin 11 is further moved downward. This downward movement is continued until a support surface of the support base 27 of the center pin 11 is moved downward to a position separated from the surface of the stamper 18 by a predetermined distance, i.e., a position at a height corresponding to the thickness of a resin recording layer of an optical disk to be manufactured. When the pin 11 is moved downward to a position at which the support surface of the support base 27 is located at the height corresponding to the thickness of the recording layer above the surface of the stamper 18, the downward movement of the pin 11 is stopped. In this case, since the disk substrate 29 is supported by the resin 36, only the center pin 11 is moved downward to the predetermined position.

Figure 6:
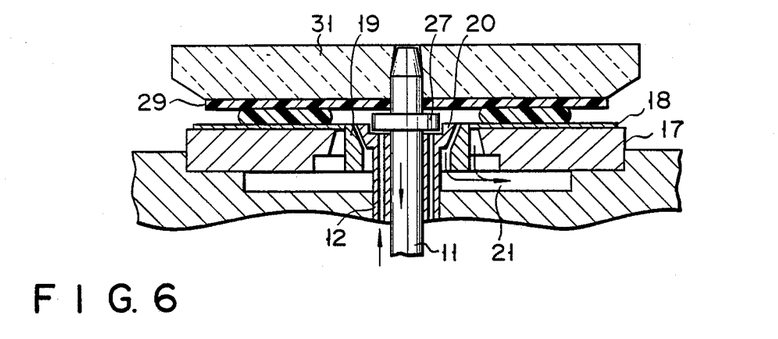

At the same time, in vacuum suction step 55, the valve member 12 is moved upward as shown in FIG. 6 to separate the valve body 20 from the guide ring 19, thereby defining a suction path between the guide ring 19 and the valve body 20.

In this state, a room surrounded by the ring-like resin 36 is formed between the stamper 18 and the substrate 29 and evacuated by the vacuum source. Since the load of the weight 31 acts on the resin 36 via the substrate 29, the resin 36 is gradually pressed by this load and spread between the stamper 18 and the substrate 29.

When the disk substrate 29 is brought into contact with the ring-like resin 36, bubbles are sometimes formed in the resin. Therefore, immediately before the substrate 29 is brought into contact with the resin 36, the substrate 29 is intermittently moved downward every one second in units of microns so as to be brought into contact with the resin 36 at one portion. Thereafter, as the disk 29 is further intermittently moved downward, a contact portion between the substrate 29 and the resin 36 is expanded in both the right and left directions along the ring. Finally, the entire periphery of the ring is brought into contact with the substrate 29. When the contact portion is formed between the ring-like resin 36 and the disk substrate 29 in this manner, bubble formation in the resin 36 can be reliably prevented.

If bubbles are still formed in the resin 36 even when the substrate 29 is brought into contact with the resin 36 as described above, the resin 36 is drawn by suction of the vacuum source from the center of the room surrounded by the resin 36 after the entire periphery of the resin 36 is brought into contact with the substrate 29. That is, the ring-like resin 36 is drawn to move inward to push the bubbles formed in the resin 36 outward. Such a phenomenon was confirmed by repetitive experiments, i.e., it was confirmed that the bubbles in the resin 36 were reliably eliminated.

In step 106, 50 seconds, e.g., are waited to hold the above state. During this wait period, the ring-like resin 36 is spread between the stamper 18 and the disk substrate 29 by the load of the weight 31, thereby reducing the height of the resin 36. The substrate 29 is moved downward with height reduction in the resin 36.

Figure 7:
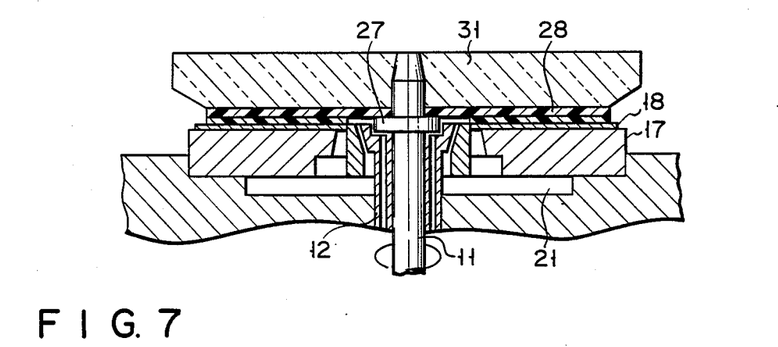

After the resin 36 is completely spread between the stamper 18 and the substrate 29, i.e., a layer of the resin 36 is formed on the entire surface of the stamper 18 on which data is recorded, the substrate 29 abuts against and is stopped by the support base 27 of the center pin 11 which is moved downward in step 105, as shown in FIG. 7.

In this state, since an interval between the stamper 18 and the substrate 29 is numerically correctly set by the lower position of the center pin 11, the thickness of the resin 36 on the data recorded surface of the stamper 18 can be easily and correctly controlled.

In this case, the stamper 18 is correctly positioned and mounted on the table 17 and effectively prevented from being peeled from the table 17 by the guide ring 19. In addition, the path 21 communicating with the vacuum source is formed at the outer periphery of the guide ring 19, i.e., at the lower side of the inner periphery of the stamper 18. For this reason, even if the resin 36 reaches the rear side of the stamper 18 upon spreading of the resin on the surface of the stamper 18, this resin is drawn by vacuum suction and reliably recovered and removed therefrom.

Figure 8:
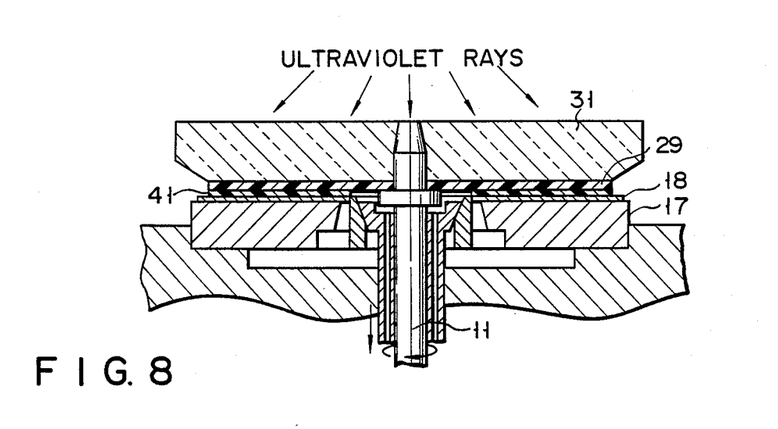

When the layer of the resin 36 is formed between the stamper 18 and the disk substrate 29 as described above, the substrate 29, the weight 31 and the like are rotated together with the table 17 as shown in FIG. 7 in table rotation step 56. In this state, in ultraviolet radiation step 57, ultraviolet rays are uniformly radiated on the entire surface of the resin 36 through the transparent weight 31, as shown in FIG. 8. As a result, the layer of the resin 36 formed between the stamper 18 and the substrate 29 is cured to form a recording resin layer 41. The record expressed by the undulations formed on the stamper 18 is transferred to the surface of the layer 41 opposite to the stamper 18. As a result, a recording surface of an optical disk is formed by the layer 41.

In this manner, the resin layer 41 on which the recording surface is formed integrally with the disk substrate 29 is obtained, thereby completing a basic structure of the optical disk. Thereafter, since the substrate 29 and the layer 41 must be integrally peeled from the surface of the stamper 18, the chamber 32 must be moved upward in chamber lifting step 58 before a peeling step starts.

Figure 9:
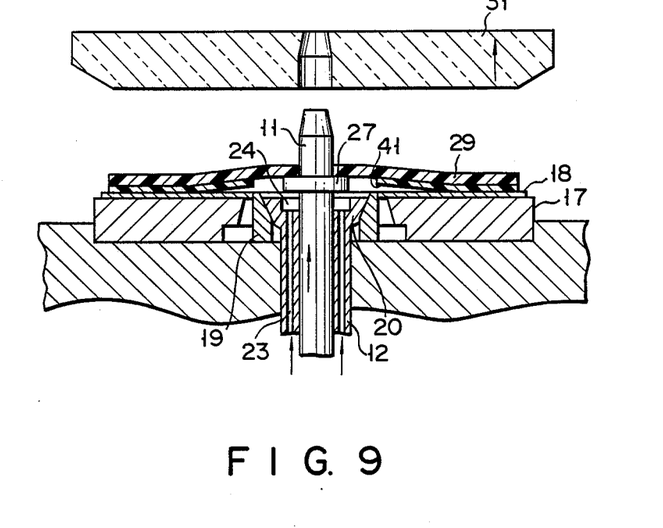

The peeling step will be described below. In step 107, the center pin 11 is moved upward by a very small amount as shown in FIG. 9. In this case, the chamber 33 is set at its upper position, and the valve member 12 is set at its lower position to close the path communicating with the vacuum space between the guide ring 19, the valve member 12 and the valve seat 20. In air supply step 59, air is supplied through the air path 22 and the path 23 formed in the valve member 12 and injected from the receiving tray 24. The injected air is supplied from the lower surface of the support base 27 to the lower surface at the central portion of the disk substrate 29 and between the recording resin layer 41 and the stamper 18, thereby peeling the layer 41 from the stamper 18. At the same time, the weight 31 is removed and moved upward.

Figure 10:
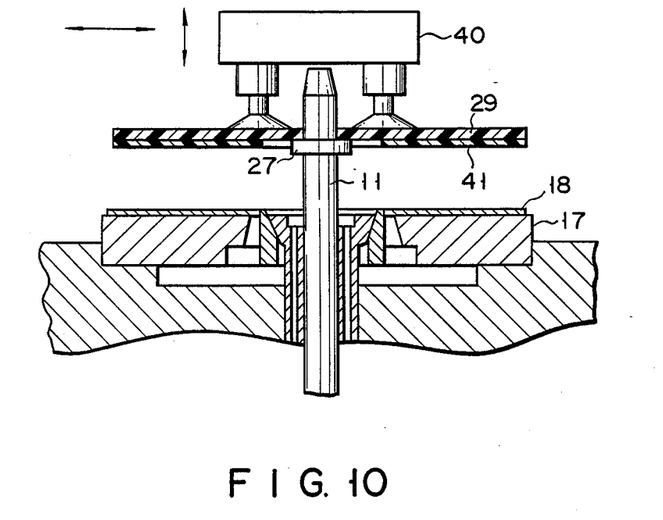

When the center pin 11 is further moved upward in step 108, the layer 41 is smoothly peeled from the surface of the stamper 18 and moved upward together with the substrate 29 to a conveyance position, as shown in FIG. 10. When the substrate 29 integrally having the layer 41 thereon is moved to the conveyance position, in disk discharging step 60, the conveyor mechanism 40 is controlled to chuck and convey the substrate 29 to a predetermined storage position.

The disk substrate 29 having the recording resin layer 41 is completed as an optical disk via a reflecting layer or protection film formation step.

What is claimed is:

1. An apparatus for manufacturing an optical information recording medium, comprising:

a table on which is placed a stamper having formed thereon undulations corresponding to recording data, said table being selectively rotatable;

stamper fixing means for fixing said stamper at a central position of said table;

a center pin set to be vertically movable in correspondence with a central portion of said stamper, a support base for placement and support of a light-transmitting disk substrate formed at a position close to an upper distal end portion of said center pin;

driving means for vertically moving said center pin;

resin setting means for setting into a ring shape on the surface of said stamper placed on said table, about said center pin, a resin having a property of curing upon radiation of ultraviolet rays;

suction means, located at a central portion of said table, and including a valve mechanism to be selectively opened/closed;

a light-transmitting weight member, having a property of transmitting, onto the resin, ultraviolet rays radiated on an upper surface thereof, said weight member being placed on the disk substrate supported by said support base; and 2. An apparatus according to claim 1, wherein said stamper fixing means comprises a guide ring set to project from the surface of said table, so as to surround a central portion of said table, said guide ring being fitted in an inner periphery of said stamper placed on said table.

control means for controlling said driving means to move said center pin upward or downward.

3. An apparatus according to claim 1, wherein said control means comprises: first descent control means, for causing said center pin to descend to a first position, at which position a lower surface of said disk substrate on the point of contact with a resin on said stamper; second descent control means, for causing said center pin to descend intermittently, in units of very small amounts, from the first position set by said first descent control means to a second position, at which position the entire periphery of said resin is brought into contact with the surface of said disk substrate; third descend control means, for causing said center pin to descend from the second position to a third position, at which position the height of a disk substrate support surface of a support base of said center pin from a surface of said stamper corresponds to a predetermined thickness of a recording resin layer; and setting means for keeping said center pin set at the third position, and when descent of said center pin is stopped by said setting means, said disk substrate is supported by said resin on said stamper and caused to descended to a position of said support base kept at the position by a load of said weight member.

4. An apparatus according to claim 3, wherein said third descent control means comprises wait means for causing said center pin to descend until said disk substrate is brought into contact with the entire periphery of said ring-like resin on said stamper and allowing said disk substrate to descend, by means of the a load exerted by said weight member, while said disk substrate is supported by said resin, and said suction means opens said valve mechanism thereof for at least a time interval between operations of said third descent control means and said setting means, thereby drawing air by suction from a central portion of said ring-like resin between said stamper and said disk substrate.

5. An apparatus according to claim 1, further comprising:
a vertically movable valve member, constituted by a cylindrical body, for insertion of said vertically movable center pin in a central hole formed therein; and
a path communicating with a vacuum source formed in an outer periphery of said valve member, characterized in that a valve body is formed at an upper end portion of said valve member and brought into contact with said guide ring set on said table constituting said stamper fixing means, when said valve member is set at a lower position, so that the valve mechanism of said suction means is constituted by said valve body.

6. An apparatus according to claim 5, wherein said guide ring projects from the surface of said table to surround said center pin and is fitted in an inner periphery of said stamper fixed on said table, an inner periphery of the distal end of said guide ring being tapered to form a valve seat which is brought into contact with said valve body.

7. An apparatus according to claim 5, wherein an outer periphery of an upper end portion of said valve member flares, and said valve body to be brought into contact with the outer periphery of said guide ring when said valve member descends is formed at an outer peripheral portion of the wide portion.

8. An apparatus for manufacturing an optical information recording medium, comprising:
a table on which is placed a stamper having formed thereon undulations corresponding to recording data;
stamper fixing means for fixing said stamper at a central position of said table;
a center pin set to be vertically movable in correspondence with a central portion of said stamper, a support base for placement and support of a light-transmitting disk substrate formed at a position close to an upper distal end thereof;
driving means for vertically driving said center pin;
resin setting means for setting on the surface of said stamper placed on said table a resin having a property of curing upon radiation of ultraviolet rays;
an air path formed to open in the surface of said table, to allow air to be blown to the outer periphery of said center pin; and
control means for controlling said driving means to move said center pin upward or downward.

9. An apparatus according to claim 8, wherein said control means comprises means for moving said center pin upward by a short distance after said center pin has been descended, thereby forming a layer of said resin between said disk substrate and said stamper mounted on said table, and means for allowing air to flow from said air path to so as to form an air layer between said resin layer and said stamper.

10. An apparatus according to claim 8, wherein said air path is formed near an outer peripheral portion of said center pin, air being supplied to said air path through an air path formed along an axis of said center pin.

11. An apparatus for manufacturing an optical information recording medium, comprising:
a table on which is placed a stamper having formed thereon undulations corresponding to recording data;
a support member, constituted by a vertically set cylinder, and having integral therewith, at an upper side thereof, a receiving base for supporting said table;
a guide ring, set on said table, to surround a central axis portion of said table, and projecting to fit in an inner peripheral portion of said stamper placed on said table;
a center pin, set to be vertically movable at a central axis portion of said support member, an upper distal end of said center pin projecting from the surface of said table, and a flange-like support base for placement and support of a disk substrate formed at a position close to the distal end portion;
a valve member set between said center pin and said support member so as to be vertically movable;
a valve body, formed at a distal end portion of said valve member corresponding to the surface of said table, and brought into contact with a valve seat formed at an inner periphery of said guide ring, thereby opening/closing a path communicating with a vacuum source;
an air path, open in an upper end portion of said valve member, for allowing selective supplying of air from said air path; and
control means for controlling movement of said center pin and an air amount to be supplied to said valve member, through said air path.

* * * * *